United States Patent [19]

White

[11] Patent Number: 4,572,004
[45] Date of Patent: Feb. 25, 1986

[54] FLUID FLOW METER FOR MEASURING THE RATE OF FLUID FLOW IN A CONDUIT

[75] Inventor: Paul R. White, Huntsville, Ala.

[73] Assignee: The United States of America as represented by the Administrator of the National Aeronautics and Space Administration, Washington, D.C.

[21] Appl. No.: 719,799

[22] Filed: Apr. 4, 1985

[51] Int. Cl.[4] .............................................. G01F 1/24
[52] U.S. Cl. ................................................ 73/861.58
[58] Field of Search ........... 73/861.53, 861.54, 861.56, 73/861.58, 861.71; 250/231 R

[56] References Cited

U.S. PATENT DOCUMENTS

| | | | |
|---|---|---|---|
| 3,623,365 | 11/1971 | Lowell et al. | 73/861.56 |
| 3,759,099 | 9/1973 | McGregor | 73/861.53 |
| 4,201,079 | 5/1980 | Worcester | 73/861.58 X |
| 4,297,899 | 11/1981 | Blaney et al. | 73/861.58 |

Primary Examiner—Herbert Goldstein
Attorney, Agent, or Firm—Joseph H. Beumer; John R. Manning; Leon D. Wofford, Jr.

[57] ABSTRACT

A tube fluid flow rate meter comprising reservoir (10) divided by flexible diaphragm (24) into two separate, isolated compartments (12 and 14) except for orifice (25) in diaphragm (24). Incoming tube (42) opens into compartment (14) and outgoing tube (44) opens into compartment (12). Orifice (25) is sized to allow maximum tube fluid flow. Opposing compression springs (34 and 36) secured within the two compartments (12 and 14) bias diaphragm (24) on opposite sides of orifice (25) to maintain orifice (25) in a given position when the tube fluid pressure is zero. A tapered element (49) is centered in, and extends through orifice (25) into compartment (12) leaving an annular opening between element (49) and the perimeter of orifice (25) whose size varies as diaphragm (24) flexes with changes in tube fluid pressure to change the fluid flow through the opening. Light source (60) directs light upon element (49) which scatters the light through the opening into compartment (14). Light detector (50) in compartment (14) senses the scattered light to generate a signal indicating the amount of fluid flow.

21 Claims, 3 Drawing Figures

FIG. I

FLUID FLOW METER FOR MEASURING THE RATE OF FLUID FLOW IN A CONDUIT

ORIGIN OF THE INVENTION

The invention described herein was made by an employee of the U.S. Government and may be manufactured and used by or for the Government of the United States of America for Governmental purposes without the payment of any royalties thereon or therefor.

TECHNICAL FIELD

This invention relates generally to a device and a method for measuring the fluid flowing through a conduit such as a tube or a pipeline and more particularly it relates to a fluid flow measuring device for measuring the instantaneous rate of flow of fluid through such tube and converting such rate of flow to an electrical signal which in turn activates a device adapted to utilize the measured rate of fluid flow in a desired manner.

BACKGROUND OF THE INVENTION

In many types of control and measuring apparatuses it is necessary to determine with considerable accuracy the amount of liquid flowing through a conduit or tube at a given instant. Examples of such applications can be found in medicine where the amount of fluid injected intravenously into a patient must be given at a metered rate, or the amount of gasoline consumption in an automobile at any given time for any speed or any given acceleration, or the amount of cooling air flowing through a conduit containing communication carrying wires which must be maintained within some predetermined temperature range.

A specific example of the prior art is shown in U.S. Pat. No. 4,007,628 to WORCESTER which shows a flow meter having a reservoir divided into first and second compartments with the fluid (or air) entering the first compartment and passing into the second compartment through a first orifice in a rigid member separating the first and second compartments. The second compartment is in turn divided into first and second sub-compartments separated by a flexible diaphragm which flexes in accordance with the amount of air flowing into the second compartment of the main receptacle from the first compartment. The diaphragm is attached to a first cylinder which extends downwardly into a second cylinder secured within the first compartment with its top end terminated and sealed at the edges of a second orifice formed in the rigid element separating the first and second compartments. At the bottom of the first cylinder is a third orifice through which extends a tapered element secured at the bottom of the second cylinder. As the volume of air increases the flexible diaphragm is flexed upwardly pulling the first cylinder also in the upward direction and moving the orifice at the bottom thereof towards the diverging end of the tapered element secured within the second cylinder, thereby increasing the annular opening between the tapered element and the orifice at the bottom of the first cylinder and permitting more air to pass downwardly between the first and second cylinders and then upwardly through the annular opening at the bottom of the first cylinder and then into the second sub-compartment of the second compartment of the main receptacle and finally out the output conduit of the system. A wedge shaped device is attached to the first cylinder and is constructed to pass varying amounts of light, which emanate from a fixed light source secured at the bottom of the second cylinder, therethrough as the first cylinder rises in response to more air passing through the system. The light passed through the wedge is detected by a light responsive device on the other side of the wedge where it is converted into electrical signals which are utilized in some suitable manner.

Another example of a prior art fluid flow meter is shown in U.S. Pat. No. 3,776,036 by TAYLOR. A float is mounted in the incoming pipeline or conduit and has a flat tail piece formed at the opposite end thereof with a cut-out portion in such tail piece. The float is mounted on a cantilever spring and moves in the direction of flow of the fluid in proportion to the pressure and therefore the amount of fluid flow. A light source is mounted on one side of the tail piece and a light detector means is located on the other side of the tail piece in such a manner that as the fluid flow rate increases a greater amount of the cut out portion of the tail piece will be moved into position between the light source and the light detector means. Thus, the amount of light detected is proportional to the movement of the float and consequently to the amount of fluid flow in the pipeline.

Still another example of the prior art is shown in U.S. Pat. No. 4,297,899 to BLANEY et al. In this relatively complex structure the fluid flow measuring device includes a flexible diaphragm element which has as part of its assembly an orifice which moves along a tapered element securely fixed within the structure independently of the moving diaphragm. As the fluid flow increases the orifice moves towards the converging end of the tapered element and permits more fluid to flow through the annular opening created between the tapered element and the orifice. The flexible diaphragm and the orifice are also attached to a shaft which forms a central core member of a differential transformer and which moves within said differential transformer to vary the electrical output thereof. There is a known relationship between the output of the differential transformer and the rate of fluid flow.

A primary object of the present invention is to provide a device which measures the rate of flow of fluid in the tube and which is relatively simple and inexpensive to construct.

Another object of the invention is to provide a fluid flow meter which is relatively simple and inexpensive to construct but yet provides a high reliability of performance.

A third object is to provide a device which can measure the rate of flow of gas or fluid, which can be either transparent or transulucent, with a high degree of accuracy.

A fourth object is to provide a fluid flow meter which measures the instantaneous rate of flow of fluid through a tube with a high degree of reliability and accuracy and which does not impede the flow of fluid.

A fifth object of the invention is the improvement generally of devices for measuring the amount and rate of flow of fluid in a tube.

SUMMARY OF THE INVENTION

In accordance with one preferred embodiment of the invention there is provided in a device comprising a tube with an enlarged reservoir-like portion formed therein which is separated by an opaque flexible diaphragm into two separate, isolated compartments except for an orifice in the diaphragm sized to allow the maximum tube fluid flow to flow freely therethrough, a combination of elements in the enlarged portion to measure the rate of fluid flow through the orifice and therefore through the tube comprising a tapered element secured within a first of the two compartments into which the fluid flows and having its converging end extend concentrically through the orifice in the direction of the fluid flow to form an annular opening between the tapered element and the perimeter of the orifice whose size varies as the diaphragm flexes in response to the fluid flow in the tube, a light source positioned in the second compartment for directing a beam of light upon the converging end of the tapered element which scatters the beam of light into the first compartment through the annular opening, and a light detecting arrangement for detecting the amount of scattered light into the first compartment and therefore the size of the annular opening and the amount of fluid flow.

DETAILED DESCRIPTION OF THE INVENTION

Figure 1:
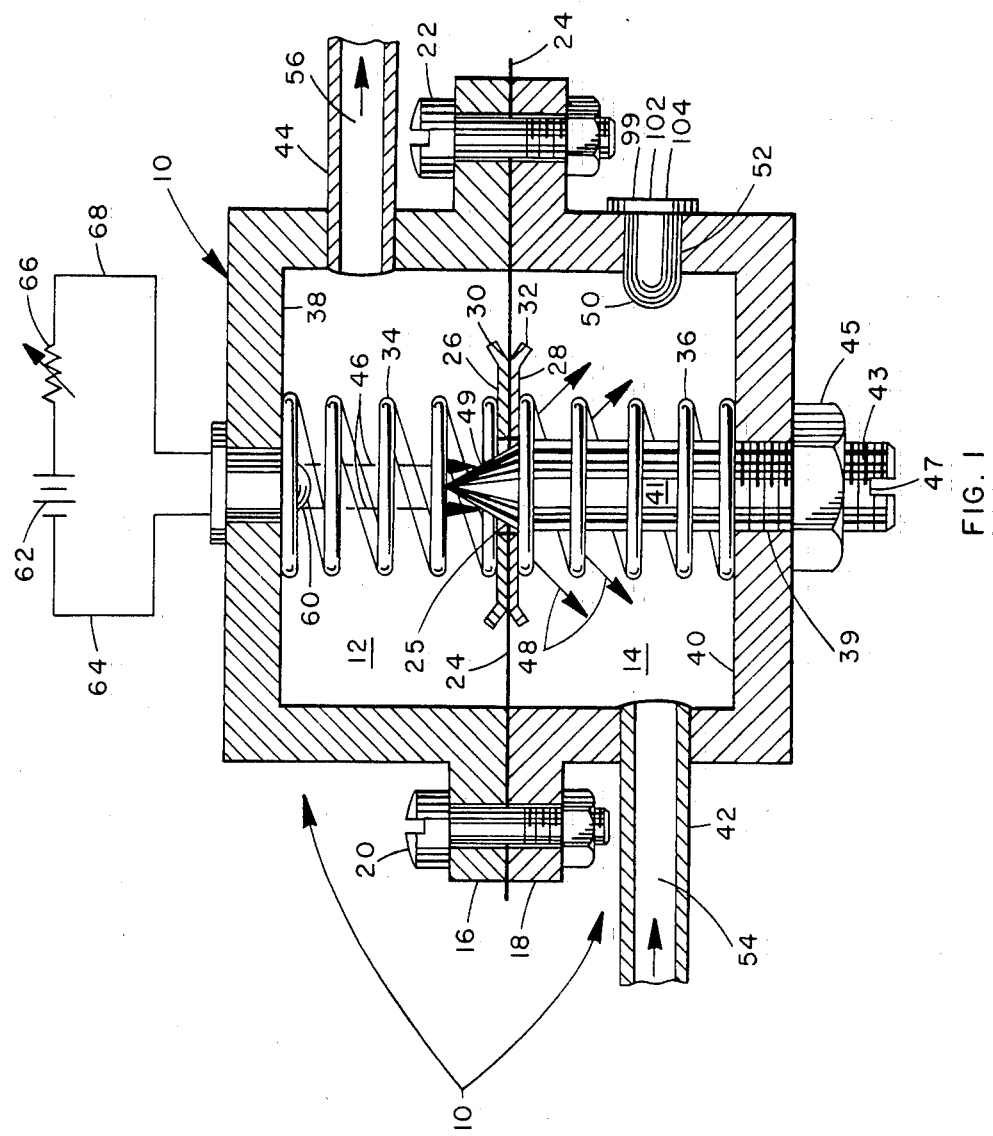
FIG. 1 is a cutaway plan view of the entire invention including some of the external circuitry.

Referring now to FIG. 1 a reservoir 10, which has a generally cylindrically shaped cross-sectional area, is divided into an upper compartment 12 and a lower compartment 14 by a flexible diaphragm 24 which is secured between flanges 16 and 18 which respectively form a part of the upper and lower compartments 12 and 14. The two flanges 16 and 18 are secured together by a series of screws such as screws 20 and 22 of which there can be six, as indicated in the perspective view of FIG. 2. A pair of circularly shaped washers 26 and 28 each having a lip 30 and 32, respectively, at their outer perimeters surround and support an orifice 25 formed in the center of diaphragm 24 and also function to support biasing springs 34 and 36 which have relatively low spring constants to allow them to move freely are positioned respectively in the upper and lower compartments 12 and 14. The other end of each of the two biasing springs 34 and 36 rest on the inner surfaces 38 and 40, respectively, of compartments 12 and 14 and, in the absence of fluid pressure, the flexible diaphragm 24 will become positioned into a relatively flat plane so that the orifice 25 is completely filled by the tapered end portions 49 of a rod-like element 41 which is secured at its lower threaded end within a threaded orifice 39 formed in the wall of compartment 14 and secured therein by a locknut 45. A slot 47 on the lower end of the rod or screwlike element 41 permits adjustment of the length of entry thereof into the lower compartment 14 of main reservoir 10 and therefore can adjust the vertical position of the conical tapered end 49 thereof so that in the absence of any fluid flow the tapered end 49 will be positioned to completely fill the orifice 25 within the flexible diaphragm 24 for purposes that will be explained in more detail in the following paragraphs.

It should be noted at this point that fluid enters into a pipeline or conduit 42 via the passageway 54 therein and leaves the upper compartment 12 via conduit or pipeline 44 through the passageway 56 formed therein after having passed through the annular opening 25 which will develop between the tapered end 49 of rodlike element 41 and the orifice 25 in flexible diaphragm 24 in the presence of fluid pressure.

When a fluid flow is present in pipeline 42 the flexible diaphragm 54 will be flexed upwardly so that orifice 25 will move upwardly along the tapered end 49 of rodlike element 41 leaving an annular opening therearound through which the fluid can pass. If the fluid flow is great enough the flexible diaphragm will flex high enough so that the tapered point 49 of rodlike element 41 will offer no impedance whatsoever to the flow of fluid through orifice 25 in flexible diaphragm 24, the now unimpeded orifice being large enough (and preferably slightly larger than the flow area of tubes 42 and 44) to permit the maximum fluid flow in the pipeline to pass therethrough with relatively insignificant impedance to such fluid flow under such conditions.

A light source 60 directs a beam of light towards the end of tapered end 49 of element 41 and is scattered by means of such tapered end portions 49, which can be of a highly polished stainless or chrome steel, for example, and is then directed into the lower compartment 14, as indicated by the arrows 48, for example. A portion of such scattered light will impinge upon a light detecting sensor which can be a photo sensitive Darlington transistor arrangements 50 and which is mounted within an orifice 52 formed within the wall of lower compartment 14 of main receptacle 10. Such light responsive sensor can be connected into a circuit as shown in FIG. 3 and including the Darlington photo transistor arrangment 50 as one example of a suitable light detecting arrangement.

It should also be noted that light source 60 can be a fiber optic light source (not shown) which can be employed to extend the light closer to the tip of the tapered portion 49 of rod 41. The light source 60 can be energized in a standard manner by a voltage source 62 which is connected directly to one terminal of light source 60 and to the other terminal of light source 60 through a current limiting resistor 66.

Figure 3:
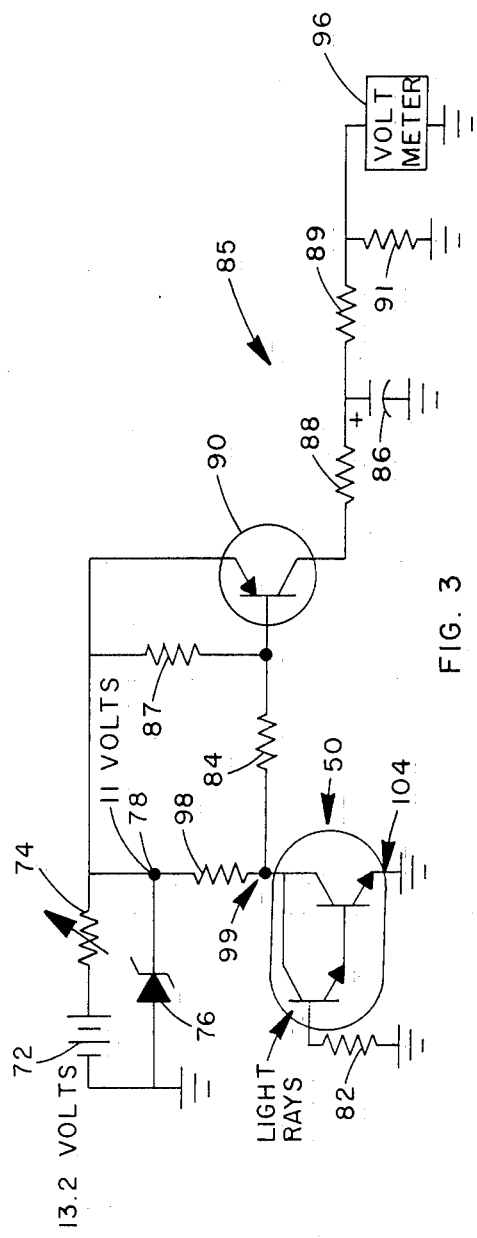
FIG. 3 shows the circuitry associated with the light sensing device.

Referring now to FIG. 3 there is shown the photo responsive device 50 which can have one thermal 102 of its three terminals connected through resistor 82 to the grounded terminal of positive 13.2 volt battery source 72 which in turn is connected across resistor 74 and a 10 Zener diode 76 to ground potential. The Zener diode 76 is selected so that a positive 11 volts appears at the junction 78 and is applied across resistor 98 and the Darlington photo transistor arrangement 50 to ground. The output impedance of the Darlington photo transistor arrangement 50 varies with the amount of light impinging thereon so as to form a voltage divider with resister 98. Thus, the positive voltage appearing at junction 99 is variable in accordance with the amount of light received by the photo transistor arrangment 50 and is supplied through resistor 84 to a circuit consisting of resistor 87, transistor 90 and a filter 85, comprised of capacitor 86 and resistors 88, 89, and 91. The filter 85 functions to filter and smooth the output of amplifying transistor 90, in a conventional manner. The overall effect of amplifier 90 and filter 85 is to invert and filter the output appearing at junction 99 and supply it to an appropriate voltmeter 96 calibrated to indicate the rate of fluid flow. In an application where the device is used to measure gasoline consumption, the output rate could be measured in gallons per hour, for example, or gallons per mile if the vehicle's acceleration and velocity are considered.

Figure 2:
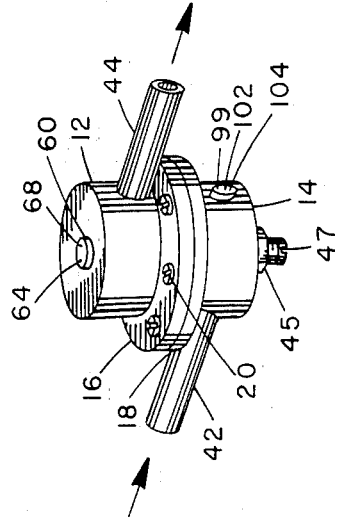
FIG. 2 is a perspective external view of the invention.

Referring now to FIG. 2 the elements shown therein are identified by the same reference characters which identify corresponding elements in FIG. 1. Thus, the upper and lower compartments 12 and 14, respectively, of the main receptacle 10 are joined together to flanges 16 and 18. The input conduit 42 is supplied to the lower compartment 14 and the output conduit 44 is connected to the upper compartment 12. Light source 60 and light responsive arrangement 50 are indicated generally, with two and three output terminals, respectively. The external circuits are not shown in FIG. 2.

In one construction of the device the diaphragm 24 can be formed of a flexible Neopreme material having an orifice 25 which preferably is slightly larger than $\frac{1}{4}''$ formed therein. The input and output tubes 42 and 44 can be standard $\frac{1}{4}''$ copper tubing, the walls of the main receptacle 10 can be either metal or plastic and $\frac{1}{8}''$ to $\frac{1}{4}''$ thick, depending on the strength of the particular material employed. The light source 60 can be selected from a range of frequencies including incandescent light to infrared with the Darlington photo transister arrangement 50 being compatible with whatever light source is selected. The rod 41 can be typically 5/16" diameter and of stainless steel or chrome plated to resist corrosion and with the tapered end 49 thereof machined to a 45 degree angle. The helical coil springs 34 and 36 can be of equal length and under slight compression of about $\frac{3}{8}''$ when no fluid flow is present so that diaphragm 24 will lie substantially in a common plane in the absence of a fluid flow, as discussed above.

It is to be understood that the form of the invention shown and described herein, including the particular materials and dimensions employed represent but one preferred embodiment thereof and that various other materials and sets of dimensions can be employed without departing from the spirit or scope of the invention.

I claim:

1. In a device comprising a tube with an enlarged portion formed therein which is separated by a flexible diaphragm into two separate, isolated compartments except for an orifice in said diaphragm sized to allow the maximum tube fluid flow to flow therethrough, a combination of elements in said enlarged portion to measure the rate of fluid flow through said orifice and therefore through said tube comprising:
   a tapered element secured within a first of said two compartments into which the fluid flows and having its converging end extend concentrically through said orifice in the direction of said fluid flow to form an annular opening between the tapered element and the perimeter of said orifice whose size varies as the diaphragm flexes in response to the fluid flow in said pipeline;
   a light source positioned in the second compartment for directing a beam of light upon the converging end of said tapered element which scatters said beam of light into said first compartment through said annular opening; and
   a light detecting means for detecting the amount of scattered light entering said first compartment and therefore the size of said annular opening and the amount of fluid flow.

2. A device as in claim 1 and further comprising a pair of opposing biasing springs positioned respectively in said first and second compartments and further positioned to exert opposing forces on said diaphragm to hold said diaphragm in a given position in the absence of fluid pressure in said tube.

3. A device as in claim 2 in which said tapered element will completely close said orifice when said diaphragm is in said given position.

4. A device as in claim 1 and further comprising means responsive to the amount of light detected by said light detecting source to indicate the rate of fluid flow in said tube.

5. A device as in claim 1 and further comprising means for adjusting the axial position of said tapered element to ensure that it will completely close said annular opening in the absence of fluid pressure in said tube.

6. A method of measuring the rate of flow of fluid in a tube comprising the steps of:
   passing the fluid through an orifice formed in a flexible diaphragm stretched across an enlarged portion of said tube;
   extending a tapered element through said orifice with the converging end of said tapered element positioned in the direction of fluid flow and dimensioned so that said orifice is completely closed by said tapered element in the absence of fluid pressure;
   directing a beam of light at the converging end of said tapered element; and
   detecting the amount of light passing through said orifice.

7. A method as in claim 6 and further comprising the step of spring biasing said flexible diaphragm to be positioned so that said orifice is completely closed by said tapered element in the absence of fluid pressure.

8. A method as in claim 6 comprising the further step of converting the detected amount of light passing through said orifice into a signal indicating the rate of fluid flow in said tube.

9. A method of measuring the rate of flow of fluid in a tube comprising the steps of:
   passing the fluid from the tube into the first compartment of a reservoir also containing a second compartment separated from said first compartment by a flexible diaphragm having a circular orifice therein;
   extending a tapered element having a cylindrically shaped cross-sectional area concentrically into said orifice with the converging end of said tapered element pointing in the direction of fluid flow and with a given cylindrically shaped cross sectional portion of said tapered element being the same size as said orifice;
   directing a beam of light towards the converging end of said tapered element; and
   detecting the amount of light passing through said orifice.

10. A method as in claim 9 and further comprising the step of spring biasing said flexible diaphragm to be positioned so that said opening is completely closed by said tapered element in the absence of fluid pressure.

11. A device for measuring the rate of flow of fluid in a tube and comprising:
   a reservoir;
   an input port for supplying fluid to said reservoir;
   an output port for removing fluid from said reservoir;
   a flexible diaphragm having an orifice near or at the center thereof and secured within said reservoir to separate said reservoir into first and second compartments and to isolate the input port from said output port to restrict the flow of fluid from said input port to said output port through said orifice and with said flexible diaphragm biased around the edges of both sides of said orifice with resilient members to cause said flexible diaphragm and therefore said orifice to be linearly displaced or flexed in response to a change in the fluid pressure in said tube;

an elongated element having a tapered end portion secured within said first compartment and having a cross-sectional area concentric with said orifice;

the converging end of said tapered portion extending concentrically through said orifice and into said second compartment of said reservoir to enable the formation of an opening between said tapered portion and the perimeter of said orifice in response to fluid pressure with said opening becoming larger as said flexible diaphragm flexes towards and into said second compartment of said reservoir in response to increased fluid pressure and with the diverging end of said tapered portion having a cross sectional area of a size equal to and coincident with the cross-sectional area size of said orifice to close said orifice when the fluid pressure is zero;

light source means for directing a beam of light towards the converging end of said tapered portion; and a light sensitive device positioned within the first compartment of said reservoir and responsive to the light from said light source means which passes through said opening between said converging end of said tapered portion and the perimeter of said orifice and is diverted towards said light sensitive device by the diverging portion of said tapered portion to generate a signal indicative of the size of said opening and therefore the amount of fluid passing through said opening and out of said output port.

12. A device as in claim 11 in which said orifice and said tapered end portion have circular cross sectional areas and in which the axis of said tapered portion is concentric with a line passing through the center of said orifice and normal to a plane containing the perimeter of said orifice.

13. A device as in claim 11 in which said tapered element is tapered in a linear manner and in which said flexible diaphragm flexes in a manner to enable said orifice to move along the axis of said tapered end portion a distance linearly proportional to the rate of flow of fluid in said tube and therefore the rate of flow of fluid through said opening.

14. A device as in claim 11 in which said light source means is positioned to direct a beam of light directly at the converging end of said tapered end portion and along the axis of said tapered element.

15. A device as in claim 11 in which said resilient members comprise first and second coil springs with said first and second coil springs resting at their first ends against the opposite inner surfaces of said reservoir within the first and second compartments of said reservoir, respectively, and with their other ends resting against opposite sides of the perimeter of said orifice.

16. In a device comprising a tube, a fluid reservoir, an input port for passing fluid into said reservoir from said tube, and an output port for carrying fluid out of said reservoir and into a continuation of said tube a structure for measuring the rate of fluid flow through said tube and comprising:

a flexible diaphragm which flexes with the amount of fluid pressure in said tube and which is secured around its perimeter to the inner surface of said reservoir to separate said reservoir into first and second compartments connected respectively to said input and output ports and having an orifice therein of a given cross-sectional size and configuration;

first means for producing spring biased opposing forces directed towards each other on both sides of said diaphragm around the perimeter of said orifice to maintain said orifice in a given position within said reservoir when the fluid pressure in said tube is zero;

a tapered element whose cross-sectional area configuration is similar to said given cross-sectional configuration of said orifice and similarly oriented is secured within said first compartment and extends through said orifice with its converging end extending into said second compartment of said reservoir to form an open area between said tapered element and the perimeter of said orifice through which fluid must flow, and further with the cross-sectional area of one portion of said tapered element being substantially equal in size and coincident in shape with the size and shape of said orifice and positioned to close said orifice when the fluid pressure in said tube is zero;

a light source secured within said second compartment of said reservoir for directing light upon the converging end of said tapered element and through said open area in a scattered manner; and a light responsive device secured within said first compartment of said reservoir and which is responsive to said scattered light to produce a signal indicative of the size of said open area and therefore indicative of the rate of flow of fluid through said open area and therefore through said tube.

17. A device as in claim 16 in which said orifice and said tapered element have circular cross sectional area and in which the axis of said tapered element is concentric with a line passing through the center of said orifice and normal to a plane containing the perimeter of said orifice.

18. A device as in claim 16 in which said tapered element is tapered in a linear manner and in which said flexible diaphragm flexes in a manner to enable said orifice to move along the axis of said tapered element a distance linearly proportional to the rate of flow of fluid through said open area and therefore through said tube.

19. A device as in claim 16 in which said light responsive device is positioned to direct a beam of light directly at the converging end of said tapered element and along the axis of said tapered element.

20. A device as in claim 16 in which said first means comprises first and second coil springs which provide said spring biasing opposing forces with said first and second coil springs resting at their first ends against those opposite inner surfaces of said reservoir which are contained within the first and second compartments of said reservoir and with their other ends pressing against opposite sides of the perimeter of said orifice.

21. In a device for measuring the rate of flow of fluid in a tube comprising a fluid reservoir divided by a flexible diaphragm secured therein into first and second compartments isolated from each other except for an orifice formed in said diaphragm and with an incoming fluid carrying tube opening into said first compartment of said reservoir and an outgoing fluid carrying tube opening into said second compartment of said reservoir, and further with said orifice, when unimpeded, being of sufficient size to allow substantially unimpeded flow of the maximum fluid flow that will ocur in said tube and comprising:

spring means secured within said first and second compartments for biasing said diaphragm around the perimeter of and on opposite sides of said orifice towards each other to maintain said orifice in a given position in said reservoir when the tube fluid pressure is zero;

an axially length-adjustable elongated element with a tapered end element secured within said reservoir with its axis normal to the plane of said orifice and centered in said orifice and with the point of said tapered end element extending through said orifice into said second compartment of said reservoir leaving an opening between said tapered end element and the perimeter of said orifice whose size varies as said diaphragm flexes with changes in the tube fluid pressure to change the amount of fluid passing through said opening;

light source means secured within the second compartment of said reservoir for directing light upon said tapered end element which responds thereto to scatter said light through said opening and into said first compartment of said reservoir; and light detecting means secured in said first compartment and responsive to said scattered light to generate a signal indicating the size of said opening and therefore the amount of fluid passing therethrough.

* * * * *